Aug. 24, 1943. J. E. BEVINS 2,327,394
RATE OF CLIMB INDICATOR
Filed March 15, 1941
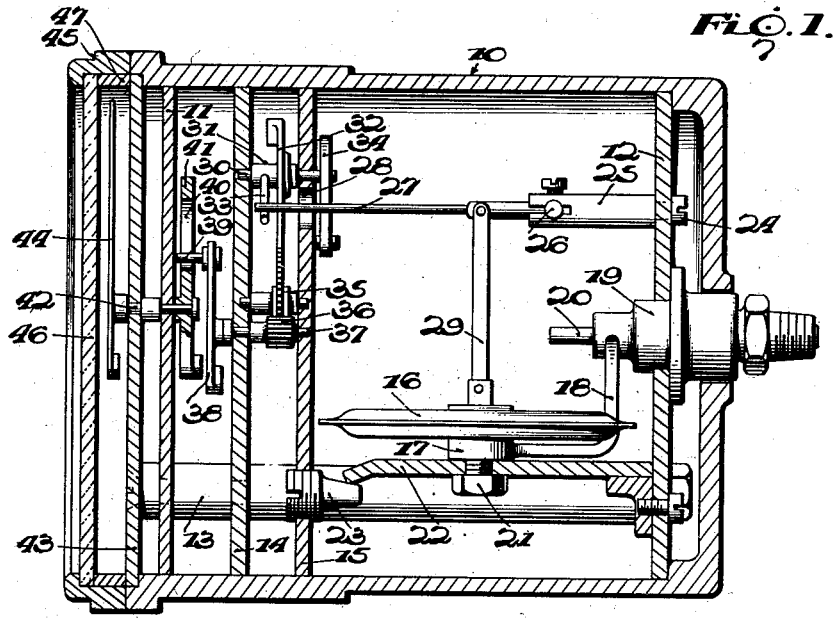
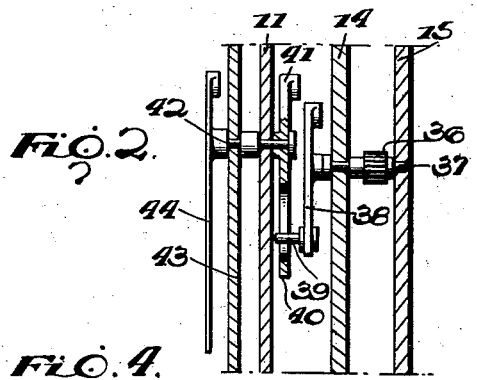
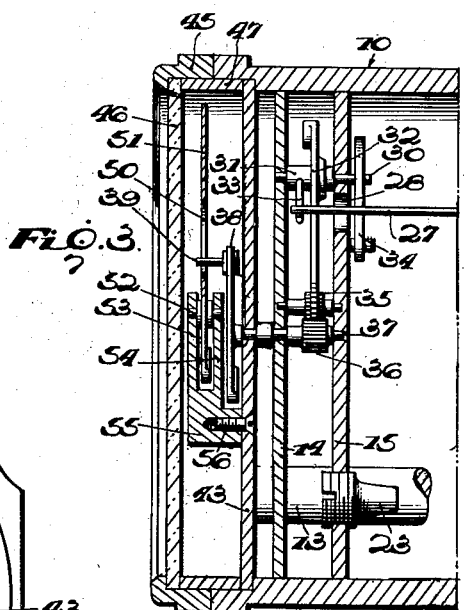
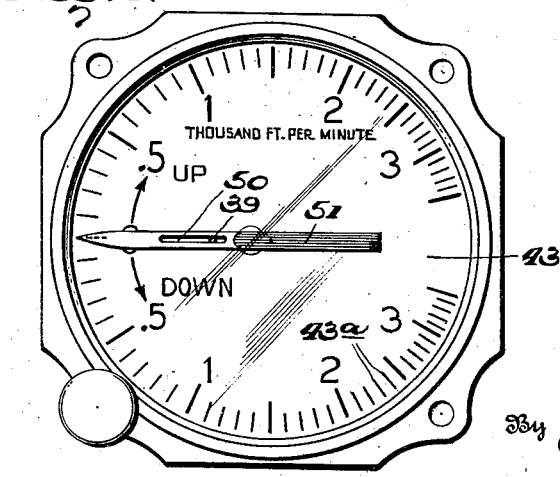
Inventor
James E. Bevins.
By Cerstvik & Kalman
Attorneys Patented Aug. 24, 1943

2,327,394

UNITED STATES PATENT OFFICE 2,327,394

RATE OF CLIMB INDICATOR

James E. Bevins, Wood-Ridge, N. J., assignor to Bendix Aviation Corporation, Bendix, N. J., a corporation of Delaware Application March 15, 1941, Serial No. 383,643

4 Claims. (Cl. 73—179)

This invention relates to indicating instruments, and more particularly to aircraft rate-of-climb indicators wherein a differential between the pressure inside and outside a pressure responsive element, established by a change in one of the pressures, is utilized to operate an indicator and, wherein the pressures equalize after the change no longer takes place. It is to be understood, however, that the invention is not limited to rate-of-climb indicators but has its application in many other instruments as well, particularly where the pointer has a sweep of 180°.

Rate-of-climb indicators heretofore known in the art have been provided with equally graduated dials whereby in order to obtain the amount of ascent or descent accurately, the space limitation on the dial made it impossible for the instrument to indicate more than 2000 feet per minute of either ascent of descent. If the dial were graduated to read in excess of 2000 feet per minute, the graduations were so closely spaced as to make it impractical for accurate reading, particularly where during blind flying knowledge of ascent or descent to within two or three feet is of the utmost importance. It is desirable that up to 1000 feet per minute of ascent or descent the pilot be informed precisely as to minute changes in ascent or descent whereas, in ascent or descent exceeding 1000 feet per minute, the reading need not be precise but approximate only. A proposed solution for accomplishing the above desirable result has been the use of a constraining resilient member functioning to progressively restrain expansion of the pressure sensitive element of the instrument once the ascent begins to exceed 1000 feet per minute. This solution, however, has been very unsatisfactory and impractical for the reason that the constraining member required constant attention and adjustment for proper operation of the instrument.

It is an object of the present invention, therefore, to provide a novel and desirable indicating instrument having novel means for overcoming the foregoing disadvantages.

Another object of the invention is to provide a novel rate-of-climb indicator having novel means whereby relatively small rates of ascent or descent will be precisely indicated and observed while relatively greater rates of climb or descent will be approximately indicated.

A further object of the invention is to provide a novel rate-of-climb indicator wherein the pointer sweeps over a portion of the dial during relatively small rates of ascent or descent at a greater rate than during relatively greater rates of ascent or descent at which time the sweep of the pointer decreases progressively as the rate of ascent or descent increases.

Still another object of the invention is to provide in combination with a pressure responsive instrument for indicating variation in pressures, a novel mechanism whereby the indication of the rate of change of pressure during relatively small changes will be the exact indication of such change while during relatively greater pressure changes the indication will be approximate only.

Another and further object is to provide a rate-of-climb instrument with a novel dial having a compressed scale whereby relatively small changes in ascent or descent may be observed to their exact values.

A still further object of the present invention is to provide a novel rate-of-climb instrument which is very sensitive around zero climb and descent and one wherein the sensitivity diminishes as the rate of climb or descent is increased.

Another object of the invention is to provide novel means whereby a conventional rate-of-climb instrument may be quickly and readily converted, without the necessity of recalibration, to a rate-of-climb instrument having a compressed scale.

The above and other objects and advantages of the invention will appear more fully hereinafter from a consideration of the detailed description which follows, when taken together with the accompanying drawing wherein two embodiments of the invention are illustrated. It is to be expressly understood, however, that the drawing is for the purpose of illustration and description only and is not designed as a definition of the limits of the invention, reference being had for this purpose to the appended claims.

In the drawing wherein like reference characters refer to like parts throughout the several views, Figure 1 is a longitudinal sectional view of one form of indicating instrument, such as a rate-of-climb indicator, embodying the present invention;

Figure 2 is a fragmentary view showing a second position of a portion of the indicating means of Figure 1;

Figure 3 is a fragmentary view of a portion of the instrument of Figure 1 embodying a second form of the invention; and, Figure 4 is a front view of the instrument of Figure 3 showing a second position of the indicating means of Figure 3.

Referring now to the drawing, and more particularly to Figure 1 thereof, there is shown an indicating instrument in the form of a novel rate-of-climb instrument, embodying the invention and comprising a housing or casing 10 having supporting front and rear plates 11 and 12 therein, which are connected together by way of suitable means such as a spacer 13, the latter further supporting a pair of spaced parallel plates 14 and 15 which together carry the indicating transmission mechanism to be described more fully hereinafter.

Mounted within the housing 10 is a pressure responsive diaphragm 16 which is subjected to the pressures within the housing on the outer side thereof and to the atmospheric pressure at the interior thereof by way of a hollow boss 17 and conduit 18 which passes through the member 19, thus unrestrictedly communicating with the pressures outside of the housing. Member 19, if desired, may be a diffuser element of the type shown in my issued Patent 2,147,962, whereby restricted communication is had between the interior of the housing and the exterior thereof by way of a conduit 20 and the member 19. Since the diffuser element does not constitute an essential element of the present invention, reference is to be had to the aforementioned patent for a more detailed description and function thereof.

The diaphragm 16 is secured by way of its boss 17 and a nut 21 to a flexible supporting member 22 which is rigidly connected at one end thereof to the rear plate 12 and has a bent portion at its free end. A conically-shaped stud 23 mounted in plate 15 contacts the bent portion of the flexible member 22 whereby upon rotation of the stud, the member 22 and diaphragm 16 may be adjusted to any desired position.

Secured to rear plate 12 by way of suitable means such as a bolt 24 is a U-shaped bracket 25 which at its free ends pivotally supports a rock-shaft 26 having secured thereto an arm 27 which passes through an aperture 28 in plate 15 for a purpose to presently appear.

A link 29 rigidly secured at one end to the diaphragm 16 for reciprocating movement during expansion and contraction of the diaphragm, is pivotally secured at its other end to the arm 26, whereby the arm is rocked about the axis of the shaft 26 in the U-shaped bracket 25 in accordance with the expansion and contraction of the diaphragm.

A stub shaft 30 is journalled in plates 14 and 15 and has an enlarged sleeve portion 31 carrying a gear sector 32 and a finger 33 which is in engagement with the free end of arm 27. The stub shaft 30 is normally urged to a predetermined position by way of a suitably mounted hair spring 34. The gear sector 32 meshes with a gear 35 journalled in plates 14 and 15 which in turn meshes with a second gear 36 mounted on a shaft 37 likewise journalled in plates 14 and 15.

In conventional climb indicators the shaft 37 would normally constitute the pointer shaft and would have an indicating pointer secured thereto at its outer end. In accordance with the present invention, however, novel means are provided between said shaft 37 and the pointer in order to obtain larger movements of the pointer at relatively small ratio of climb or descent and progressively smaller movements as the rate of climb or descent increases. For this purpose the shaft 37 has secured thereto at its outer end a driver arm 38 provided with a pin 39 which projects into an elongated slot 40 of a driven arm 41 and slidably engages the latter to actuate it.

The driven arm 41 is secured to a shaft 42 which is journalled in plate 11 for rotation on an axis that is eccentric with respect to the axis of shaft 37 so that the rate of movement of said arm 41 is progressively decreased as it is actuated further in either direction from its initial or zero position as will appear more fully hereinafter.

The shaft 42 projects through an opening in dial 43 and has secured thereto at its outer end a pointer 44 which cooperates with a scale 43a on said dial 43.

The open end of casing 10 is closed and sealed air-tight by means of a bezel 45 within which is a cover-glass 46 and sealing ring 47, the latter being interposed between the cover-glass 46 and the dial 43.

The scale 43a is a compressed scale and is arranged for reading both climb and descent in 180° sweeps for each condition. Since greater sensitivity in the instrument is desirable in climbs or descents up to rates of 1000 feet per minute, the scale is provided with further spaced apart graduations between zero and 1000 feet per minute of climb or descent while for rates exceeding 1000 feet per minute and graduations are progressively spaced closer to one another as clearly shown in Figure 4.

In operation, as the craft climbs or descends, a pressure differential is created on the outside and inside of the diaphragm 16 due to the restricted communication between the interior and exterior of the housing and the unrestricted communication between the interior of the diaphragm and the atmosphere outside of the housing. During craft climb the pressure interior of the housing leads the pressure interior of the diaphragm, thereby causing the diaphragm to contract, whereas during descent the pressure interior of the diaphragm leads the pressure interior of the housing thereby causing the diaphragm to expand, thus indicating descent.

With diaphragm contraction, as the craft ascends, the link 29 is pulled downwardly carrying arm 27 downwardly therewith, the latter moving finger 33 and rock-shaft 30 in a counter-clockwise direction against hair spring 34. Gear sector 32 moves angularly with shaft 30 to rotate gears 35 and 36, whereby shaft 37 moves driving arm 38 and pin 39 in a clockwise direction. Pin 39, by virtue of its confinement within slot 40, urges driven arm 41 together with pointer 44 in a clockwise direction over dial 43 to indicate climb.

The dial scale graduations 43a are relatively greatly spaced apart between the zero indication of climb and 1000 feet per minute of climb, as shown in Figure 4, because by virtue of linkage 38, 41 the pointer 44 travels more rapidly within this range than it does at rates exceeding 1000 feet per minute. Due to this arrangement the readings of actual climb or descent are made accurately to within a few feet. Greatest sensitivity is therefore provided for the pointer 44 when the pin 39 of driver arm 38 assumes the position illustrated in Figure 1 wherein the pin 39 is at its lowermost position within the slot 40. At this point the effective lever length of the driven arm 41 is substantially equal to the distance from the center of shaft 42 to the center of pin 39 so that for equal incremental values of movement of diaphragm 16 the pointer 44 moves as a substantially direct function of diaphragm movement. Due to increasing rate of climb or descent, the sensitivity of the pointer 44 and the ratio of its sweep decreases with respect to the same diaphragm movement, until pin 39 reaches its uppermost position within slot 40, where the sensitivity of the pointer movement is at a minimum value. This results for the reason that the effective lever length of driven arm 41 increases progressively, thereby progressively decreasing the pointer sweep for equal incremental expansion and contraction of the diaphragm until the lever length of arm 27 becomes substantially equal to the distance from the center of shaft 41 to the center of pin 39 as shown in Figure 2.

The advantages of the foregoing arrangement are obvious since it is within the first range (0 to 1000 feet), only, that the pilot needs precise information with regard to rate of climb or descent of his ship while, where the climb or descent exceeds a rate of 1000 feet per minute, it is sufficient that such rate of climb or descent be known approximately only.

A second form of the invention is illustrated in Figures 3 and 4 wherein parts corresponding to like parts in Figures 1 and 2 are designated by the same reference numerals, and wherein the mechanism for performing the purpose stated is arranged so that the driven arm 41 may be dispensed with.

The driver arm 38 together with pin 39 moves angularly in accordance with either the contraction or expansion of the diaphragm, the pin 39 being confined to travel within a slot 50 of a pointer 51 which is mounted for rotatable movement over dial 43 by means of a shaft 52 journalled in the arms 53 and 54 of a supporting bracket 55 which is securely fastened to the dial 40 by suitable means such as a screw 56.

The operation of the structure of Figures 3 and 4 is similar to that described in detail in connection with the structure of Figures 1 and 2. As diaphragm 16 contracts during climb, the driver arm 38 is rocked clockwise to initially move pointer 51 therewith, by virtue of the engagement of pin 39 in slot 50, substantially as a direct function of the incremental contraction of the diaphragm. As the rate of climb exceeds 1000 feet per minute the effective lever length of the slotted pointer increases thereby decreasing progressively the ratio of the pointer sweep to diaphragm contraction until the pin 39 assumes its uppermost position within slot 50 in the manner shown in connection with slot 43 of Figure 2. At this latter point minimum sensitivity on the part of pointer 51 is obtained. The same operation ensues in a reverse direction when the craft descends and the diaphragm expands in accordance with the rate of descent.

It will now become readily apparent to those skilled in the art that a novel and reliable rate-of-climb instrument has been provided, whereby rates of climb and descent within the desired range can be precisely noted due to the increased spacing of the graduations within the desired range at a sacrifice of the space for graduations beyond the range where approximate readings only are sufficient, and also wherein the observed range of climb and descent has been increased over the range that heretofore could be indicated.

Another advantage of the present invention resides in that a conventional rate of climb instrument can be easily and quickly converted to use with the compressed scale of Figure 4 without the necessity for recalibration for the reason that the motion ratio varying mechanism including driver arm 38, pin 39 and slots 40 or 50 is disposed between the stub shaft 30 and the indicating pointer. Dial 43 embodying the compressed scale 43a is likewise of conventional size and may readily replace the conventional dial used on the conventional instrument.

Although only two embodiments of the invention have been illustrated and described in detail, other changes and modifications, which will now appear to those skilled in the art, may be made without departing from the scope of the invention. Reference is, therefore, to be had to the appended claims for a definition of the limits of the invention.

What is claimed is:

1. In a rate-of-climb instrument, a casing having an open end, a dial closing the open end of said casing provided with a compressed graduated scale thereon whose graduations are spaced apart a predetermined amount at one end of the scale and whose spacings progressively decrease toward an opposite end of said scale, a pressure responsive element in said casing and having its interior in communication with the atmosphere outside of said casing, means providing a restricted communication between the interior of the casing and the atmosphere outside thereof whereby said element responds to the pressure differential created thereon during climb or descent of the craft upon which the instrument is mounted, said element expanding or contracting in equal incremental amounts for equal incremental changes in pressure, means comprising a rock-shaft responsive to the operation of said element, means comprising a pointer superimposed for movement over said scale and having a slotted driven member for indicating the operation of said element, and means comprising a driving member operated by said rock-shaft for engaging and driving said driven member whereby said pointer is driven over said one end of said scale at a ratio of movement which is relatively greater during relatively small pressure differentials acting on said element and for actuating said pointer over the opposite end of said scale at a ratio of movement which progressively decreases as the pressure differential on said element increases.

2. In a rate-of-climb instrument, a casing having an open end, a dial closing the open end of said casing provided with a compressed graduated scale thereon whose graduations are spaced apart a predetermined amount at one end of the scale and whose spacings progressively decrease toward an opposite end of said scale, a pressure responsive element in said casing and having its interior in communication with the atmosphere outside of said casing, means providing a restricted communication between the interior of the casing and the atmosphere outside thereof whereby said element responds to the pressure differential created thereon during climb or descent of the craft upon which the instrument is mounted, said element expanding or contracting in equal incremental amounts for equal incremental changes in pressure, means comprising a rock-shaft responsive to the operation of said element, a pointer superimposed for movement over said scale for indicating the operation of said element and having a slotted portion therein, and means comprising a driving member connected for movement with said rock-shaft and engaging the slotted portion for actuating said pointer over said one end of said scale at a ratio of movement which is relatively greater during relatively small pressure differentials acting on said element and for actuating said pointer over said opposite end of said scale at a ratio of movement which progressively decreases as the pressure differential on said element increases.

3. An indicating instrument comprising a casing having an open end, a dial closing the open end of said casing and having a pair of graduated scales thereon, each of whose graduations are spaced apart a predetermined amount at a common end of the scale and whose spacings progressively decrease towards ends opposite the common end, a pressure responsive element in said casing and having its interior in communication with the atmosphere outside of said casing, means providing restricted communication between the interior of the casing and the atmosphere outside thereof whereby said element responds to the pressure differential created thereon during climb or descent of the craft upon which the instrument is mounted, said pressure responsive element expanding or contracting in equal incremental amounts for equal incremental changes in pressure, slotted driven means comprising a pointer superimposed for movement over said scale for indicating the operation of said element, and means including a driving member cooperating with the slotted driven means and controlled by the operation of said element during craft climb for actuating said driven means and driving said pointer over the first part of one of said scales at a ratio of movement which is relatively greater during relatively small pressure differentials acting on said element due to a relatively small rate of craft climb and for actuating said pointer over the second part of said one scale at a ratio of movement which progressively decreases as the pressure differential on said element increases in response to relatively greater rate of craft climb, said last-named means being controlled by the operation of said element during craft descent for actuating said pointer over the first part of the second of said scales at a rate relatively greater during relatively small rates of craft descent and at a relatively smaller rate over the second part of said second scale when the rate of descent is relatively greater.

4. An indicating instrument comprising a casing having an open end, a dial closing the open end of said casing and provided with a compressed graduated scale consisting of a first part of relatively farther spaced apart graduations and a second part of relatively closely spaced apart graduations, a pressure responsive element within said casing adapted for expansion or contraction in equal incremental amounts for equal incremental changes in a pressure being measured, slotted driven means comprising a pointer superimposed for movement over said scale for indicating the operation of said element, and means including a driving member cooperating with the slotted driven means and controlled by the operation of said element for actuating said pointer over the first part of said scale at a ratio of movement which is relatively greater during relatively small pressure changes acting on said element and for actuating said pointer over the second part of said scale at a ratio of movement which progressively decreases as the pressure change on said element increases whereby incremental pressure changes up to a predetermined pressure change may be more accurately ascertained upon the first part of said scale than the incremental pressure changes exceeding said predetermined pressure change.

JAMES E. BEVINS.